Dec. 26, 1933.  G. W. VEALE  1,941,330
AIR DISTRIBUTOR FOR AUTOMOBILE HEATERS
Filed Aug. 28, 1930
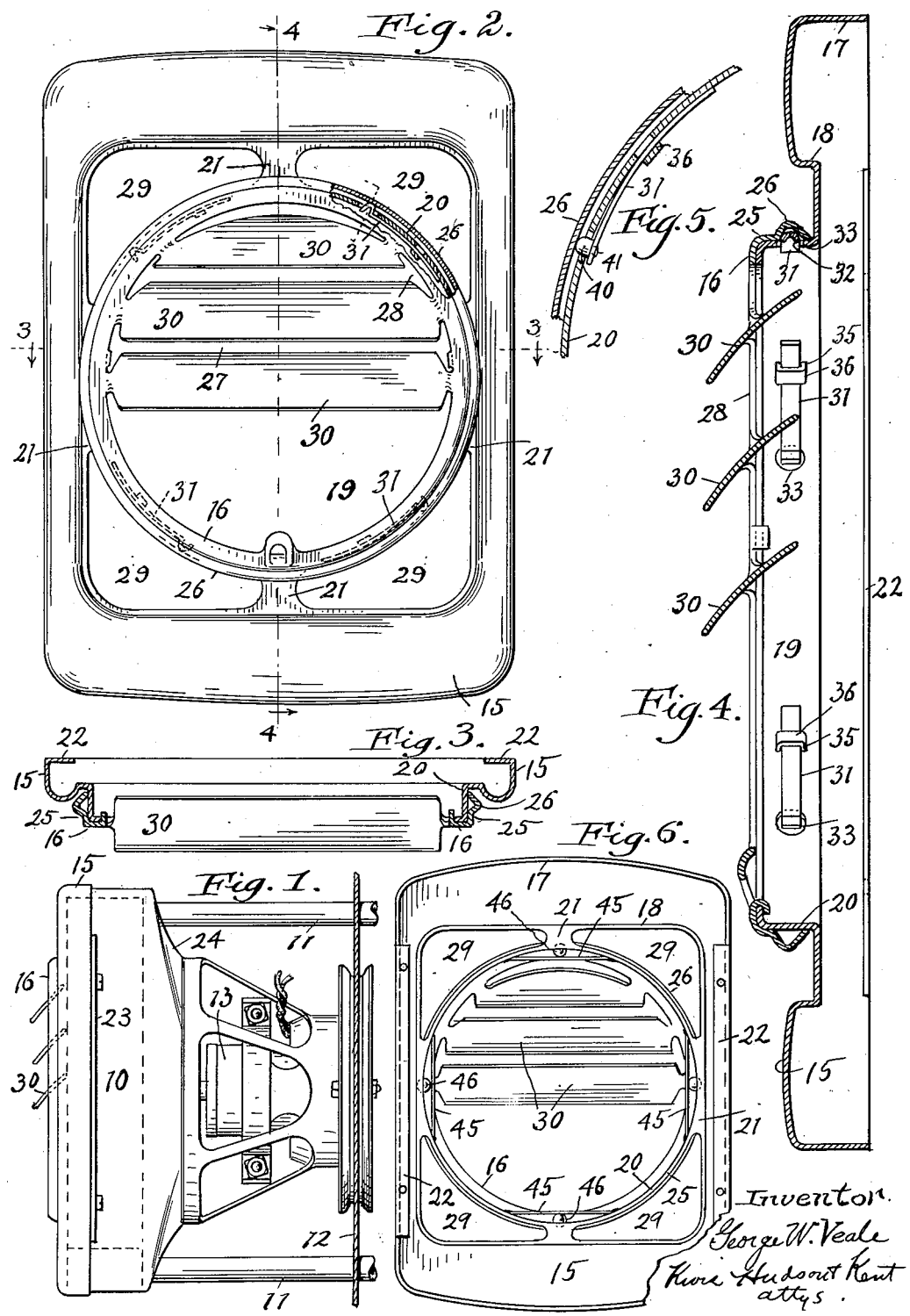

Patented Dec. 26, 1933

1,941,330

UNITED STATES PATENT OFFICE 1,941,330

AIR DISTRIBUTOR FOR AUTOMOBILE HEATERS

George W. Veale, Cleveland Heights, Ohio, assignor to Eaton Manufacturing Company, Cleveland, Ohio, a corporation of Ohio Application August 28, 1930. Serial No. 478,393

6 Claims. (Cl. 98—2)

This invention relates to air distributors for automobile heaters of the type comprising a radiator connected to the engine cooling water system, and having a fan for circulating air therethrough for heating the driver's or passenger's compartment of a motor vehicle, and more particularly to a deflector carried by the radiator shell for directing the heated air therefrom.

It is an object of the invention to provide an improved construction of the deflector and shell for the radiator that will be neat in appearance, convenient to adjust, and relatively simple and inexpensive to manufacture.

Other objects and features of novelty will be apparent as the following description proceeds, reference being had to the accompanying drawing, in which Figure 1 is a side elevation of one type of automobile heater embodying the present invention.

Fig. 2 is an enlarged front elevation of the same.

Fig. 3 is a section taken along the line 3—3 of Fig. 2.

Fig. 4 is an enlarged section taken along the line 4—4 of Fig. 2.

Fig. 5 is an enlarged detail section showing a modified mounting of the deflector on the shell, and Fig. 6 is an elevation of the reverse side of a radiator shell and deflector, showing a further modified mounting.

Referring more particularly to the drawing, the present invention is illustrated in connection with one type of automobile heater, as shown in Fig. 1. The heater comprises a radiator core 10 connected by pipes 11 to the engine cooling system, which pass through the automobile dash 12. A motor 13 is mounted between the dash 12 and the core 10 and carries a fan which circulates air, to be heated, through the core 10. The arrangement and mounting of the elements mentioned above are fully described and claimed in my copending application Serial Number 478,392, filed August 28, 1930.

The core 10 is provided with a shell 15, which carries a deflector 16, for directing the stream of heated air issuing from the core 10. The preferred embodiment of the shell 15 and deflector 16 and the mounting thereof is illustrated in Figs. 2, 3 and 4.

Referring to these figures, the shell 15 is preferably a sheet metal stamping having a substantially rectangular channel shaped margin including an outer flange 17 and an inner flange 18. Within the flange 18, the metal is cut away to form a central aperture 19 surrounded by an annular flange 20. The metal between the flanges 18 and 20 is also cut away to expose the portion of the radiator core located outside of the flange 20 as shown at 29, leaving webs 21 connecting the flanges 18 and 20. For mounting the shell with respect to the core, flanges 22 are turned inwardly from the outer flange 17 at the sides of the shell. The flanges 22 are preferably bolted to corresponding flanges 23 turned outwardly from a casing 24 enclosing the rear of the core 10.

The deflector 16 is also a sheet metal stamping having an annular rim 25 provided with an annular groove 26. The metal within the rim 25 is slotted transversely as at 27, and arcuate slots 28 are cut at the ends of the slots 27. The strips of metal defined by these slots are twisted as best shown in Fig. 4, forming vanes 30 which are disposed at an angle to the original plane of the metal, and may be slightly arcuate in cross section, as shown.

The rim 25 and the flange 20 form cooperating flanges which are relatively rotatable, whereby the deflector is rotatably mounted on the shell for adjustment with respect thereto, so that the blast of heated air may be deflected by the vanes 30 in any desired direction.

To retain the rim 25 on the flange 20 and to afford a frictional engagement therebetween, a spring 31 is secured to the inner side of the flange 20, and carries a spherically surfaced portion 32, and the flange 20 is provided with spaced apertures 33, through which the portions 32 project and engage the groove 26, being held in frictional engagement therewith by the spring 31. In the form shown in Figs. 2, 3 and 4 the flange 20 is laterally slotted as at 35 and the metal therebetween is pressed inwardly, forming a strap 36 under which one end of the leaf spring 31 is inserted, the spring being held in position by the engagement of the portion 32 with the aperture 33. The spherically surfaced portion 32 is constructed in this form, by pressing the free end of the spring into a spherical form, so that the spring 31 and portion 32 are integral.

This arrangement may be slightly modified as shown in Fig. 5, by providing a separate element 40 having a projection 41 entering an aperture in the free end of the spring, and peened over or upset to retain the same in position. Otherwise, this form is identical with that shown in the preceding figures.

A further modification is illustrated in Fig. 6, in which a leaf spring 45 is secured, as by soldering or welding at both ends, to the inner side of the flange 20. Metal balls 46, such as used in ball-bearings, preferably of slightly larger diameter than the apertures 33, are snapped under the springs 45 and held thereby in the apertures 33. When the rim 25 of the deflector is forced over the flange 20, the balls 46 are forced inwardly against the yielding action of the springs 45 so that the rim 25 may snap thereover, after which the springs 45 force the balls 46 outwardly into frictional engagement with the groove 26.

In each of the forms described the spherically surfaced portion 32 is spring pressed to extend through the apertures 33, so that the rim 25 may be snapped thereover for assembly, and thus form a rotatable mounting for the deflector 16. Also the frictional engagement of the spherical surface with the groove 26, will permit angular adjustment and frictionally hold the deflector 16 in selected position.

While several embodiments of the present invention have been illustrated and described in such detail as to enable any one skilled in the art to practice the invention, it is to be understood that the invention is not limited to the exact details disclosed other than as necessitated by the development of the prior art and the scope of the appended claims, and that the invention embraces such embodiments of the disclosed ideas as are commensurate with applicant's novel contribution to the art.

Having thus described my invention, I claim:

1. In an automobile heater, in combination, a radiator shell having an annular flange, a deflector having a flange rotatably mounted on said annular flange and provided with a groove, vanes carried by said deflector within the flange thereof, and friction means interposed between said flanges and engaging said groove.

2. In an automobile heater, in combination, a radiator shell having an annular flange, a deflector having a flange rotatably mounted on said annular flange, vanes carried by said deflector within the flange thereof, one of said flanges having an annular groove, and the other having an aperture therein, a spring secured to the latter flange and extending over said aperture, and friction means carried by said spring and extending through said aperture and engaging said groove.

3. In an automobile heater, in combination, a radiator shell comprising a sheet metal stamping having a marginal flange, a central annular flange, and web portions connecting said flanges, a deflector comprising a sheet metal stamping having an annular grooved marginal flange rotatably mounted on said central annular flange, vanes formed from portions struck up from the metal of said deflector within said grooved annular flange and twisted to dispose the same at an angle to the original plane thereof, said central annular flange having apertures therein and leaf springs secured to the inner side thereof and extending over said apertures, and means projecting through said apertures and held by said springs in frictional engagement with said groove.

4. In an automobile heater, in combination, a radiator shell having an annular flange, a deflector having a flange rotatably mounted on said shell flange and provided with an annular groove, vanes carried by said deflector within the flange thereof, said shell flange having apertures therein, and straps struck inwardly therefrom adjacent said apertures, leaf springs carried by the inner side of said shell flange having one end inserted under said straps, the free ends of said springs being provided with projections extending through said apertures and frictionally engaging said groove.

5. In an automobile heater, in combination, a radiator shell having an annular flange, a deflector having a flange rotatably mounted on said shell flange and provided with an annular groove, vanes carried by said deflector within the flange thereof, said shell flange having apertures therein, and straps struck inwardly therefrom adjacent said apertures, leaf springs carried by the inner side of said shell flange having one end inserted under said straps, the free ends of said springs having secured thereto rounded members extending through said apertures and frictionally engaging said groove.

6. In an automobile heater, in combination, a radiator shell having an annular flange, a deflector having a flange rotatably mounted on said shell flange and provided with an annular groove, vanes carried by said deflector within the flange thereof, said shell flange having apertures therein, chordal leaf springs secured to said shell flange at each side of said apertures, and metal balls in said apertures and pressed by said springs into frictional engagement with said groove.

GEORGE W. VEALE.